US009255549B1

(12) United States Patent
Brown

(10) Patent No.: US 9,255,549 B1
(45) Date of Patent: Feb. 9, 2016

(54) LASER IGNITION FOR LIQUID PROPELLANT ROCKET ENGINE INJECTORS

(76) Inventor: William S. Brown, Newbury Park, CA (US)

( * ) Notice: Subject to any disclaimer, the term of this patent is extended or adjusted under 35 U.S.C. 154(b) by 1826 days.

(21) Appl. No.: 08/896,737

(22) Filed: Jul. 21, 1997

(51) Int. Cl.
*F02K 9/00* (2006.01)
*F02K 9/95* (2006.01)

(52) U.S. Cl.
CPC .... *F02K 9/00* (2013.01); *F02K 9/95* (2013.01)

(58) Field of Classification Search
CPC ...................................... F02K 9/00; F02K 9/95
USPC ............. 60/39.821, 39.06, 258, 740; 102/201
See application file for complete search history.

(56) References Cited

U.S. PATENT DOCUMENTS

| 3,300,968 A | * | 1/1967 | Fullman ...................... 60/39.821 |
| 3,603,092 A | * | 9/1971 | Paine .............................. 60/258 |
| 3,780,952 A | * | 12/1973 | Huang ............................. 60/258 |
| 5,161,379 A | * | 11/1992 | Jones et al. ..................... 60/258 |
| 5,456,065 A | * | 10/1995 | Dargies ........................... 60/258 |
| 5,515,681 A | * | 5/1996 | DeFreitas ................. 60/39.821 |
| 5,660,039 A | * | 8/1997 | Sion et al. ....................... 60/258 |
| 5,857,323 A | * | 1/1999 | Beveridge et al. .............. 60/258 |

* cited by examiner

*Primary Examiner* — Ehud Gartenberg
*Assistant Examiner* — William Breazeal
(74) *Attorney, Agent, or Firm* — Cantor Colburn LLP

(57) ABSTRACT

A laser ignition device is used for igniting propellants in a rocket engine. The laser ignition device has an injector housing with passages for flowing gaseous hydrogen and liquid oxygen to injector elements which mix the hydrogen and oxygen in a combustion chamber. A laser ignition system assembly is inserted through the housing. The propellants in the housing keep the housing and the laser ignition system assembly cool. A laser beam entering the laser ignition system assembly via a fiber optic cable passes though a lens for diverging the laser beam and a second lens for converging the beam. A portion of the laser ignition system assembly extends beyond the injector housing face plate into the combustion chamber of the rocket engine. A multi-faceted pyramid reflector at the tip of the laser ignition system assembly in the combustion chamber splits the converging laser beam into beamlets which emerge from the laser ignition system assembly parallel to the ignition face plate and ignite the propellant a plurality of points in the combustion chamber adjacent to the injector elements. A purging gas may be introduced inside of the laser ignition system assembly to help cool the laser optic therein and helps keep the laser optics clean. The purging gas exits the laser ignition system assembly into the combustion chamber.

4 Claims, 3 Drawing Sheets

LASER IGNITION FOR LIQUID PROPELLANT ROCKET ENGINE INJECTORS

BACKGROUND OF THE INVENTION

1. Field of the Invention

This invention relates to laser beams for igniting injector propellants, and more particularly to the structure for protecting the laser optics for use in cryogenic rocket engine injectors.

2. Description of the Related Art

In the past laser beams have been used in place of spark plugs in some engines. The lasers used optical systems with a very intense focal point. The laser beams are so intense that the optical system quickly degrades due to the thermal energy of the laser beams degrading the optics.

Where laser beams have been introduced into engines through windows the lenses, windows and other optical components in the laser system have degraded due to thermal stress from the high temperatures in the combustion chambers.

SUMMARY OF THE INVENTION

The invention relates to a laser optics housing extending through an injector for the introduction of a laser beam into the combustion chamber of a rocket engine while protecting the optics utilized by the laser beam. A laser beam is guided into a fiber optic assembly on one end of the housing by a fiber optic cable. The laser beam is then transmitted into a tube having a collimating lens which collimates the laser beam. The laser beam travels through the tube as collimated light and is then converged by a focusing lens and passes through a protective window into a structural cone with a multi facet pyramid mirror at the apex. The laser beam is divided into multiple beams and reflected by the multi facet pyramid mirror, which extends slightly past the end of the injector face plate, and into a rocket engine combustion chamber such that the laser beam emerges from the housing parallel to the injector face plate igniting the propellants emanating therefrom. The housing containing the laser beam optics is protected from the damaging heat of the combustion chamber by being surrounded by the injector which carries cryogenic gases to the combustion chamber. The optics are further protected from the heat of the combustion chamber by being actively cooled with a high pressure coolant gas such as $GN_2$ flowing inside of the structural cone. The $GN_2$ cools the structural cone, the reflector, and the window adjacent the reflector. The gas flowing over the reflector also helps keep the reflector surface clean.

OBJECTS OF THE INVENTION

It is an object of the invention to introduce a laser beam into the combustion chamber of an engine to ignite propellants.

It is a further object of the invention to protect the laser optics from damage due to heat from the combustion chamber and from the laser itself.

It is a still further object of the invention to introduce the laser beam into the combustion chamber parallel to the injector face plate.

It is also an object of the invention to provide a plurality of laser beams in an injector having a plurality of injector elements for providing ignition points at more than one injector element simultaneously for better flame distribution in the combustion chamber.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
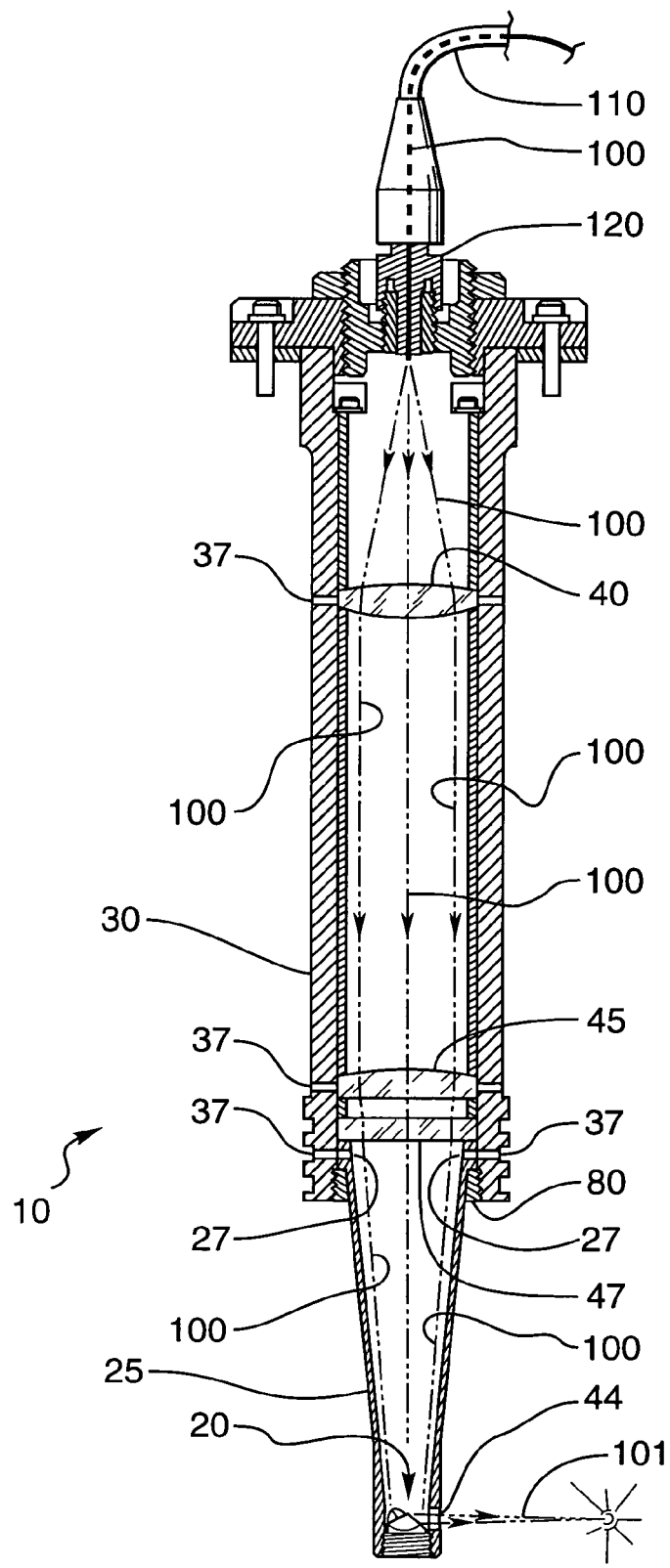
FIG. 1 shows a cross section view of the laser injector system assembly.
Figure 2:
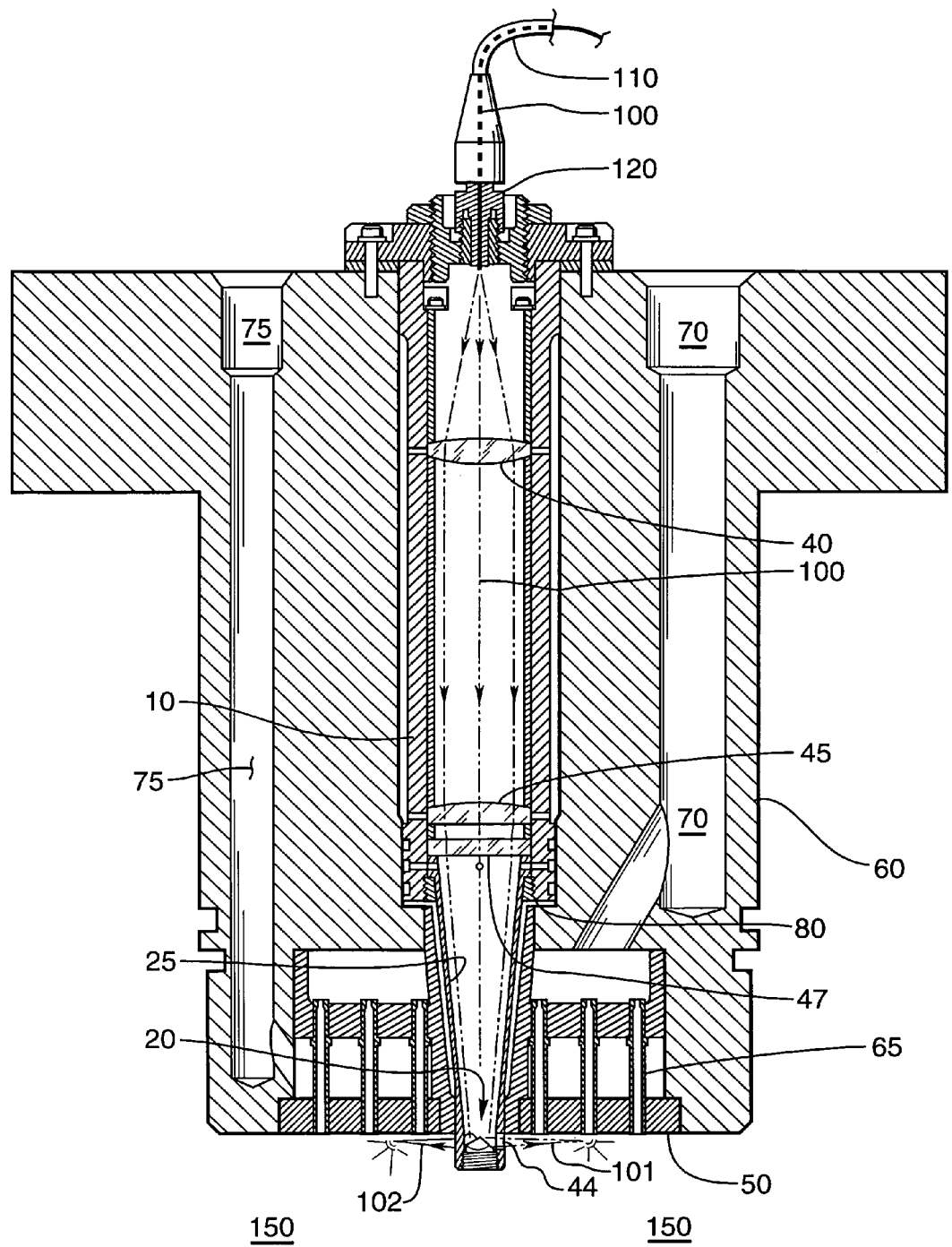
FIG. 2 shows a cross section view of the laser injector system assembly in an injector.
Figure 3:
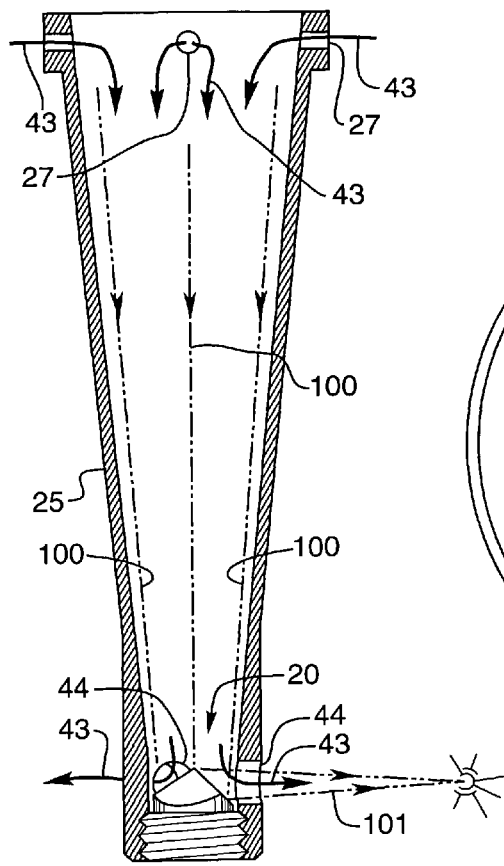
FIG. 3 is the side view of the silicon carbide cone and reflector.

As shown by FIGS. 1 and 2 a laser injector assembly system 10 is used for inserting a laser beam 100 through a rocket engine injector housing 60 into the rocket engine's combustion chamber 150 to ignite propellant emanating from injector face plate 50.

Figure 5:
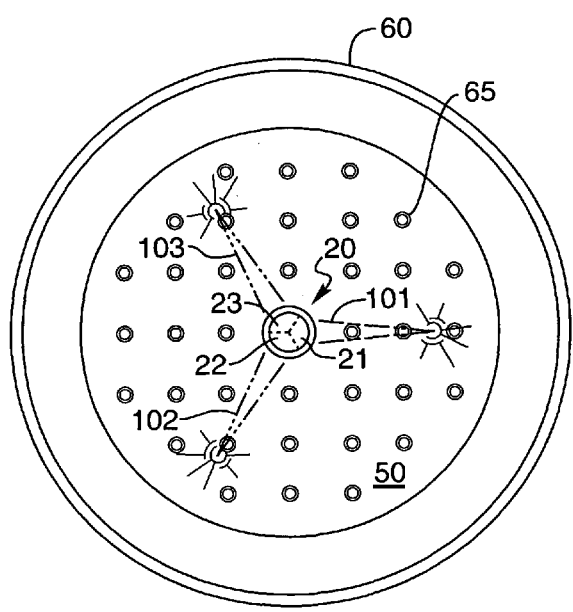
FIG. 5 is a bottom view of the injector face plate.
Figure 4:
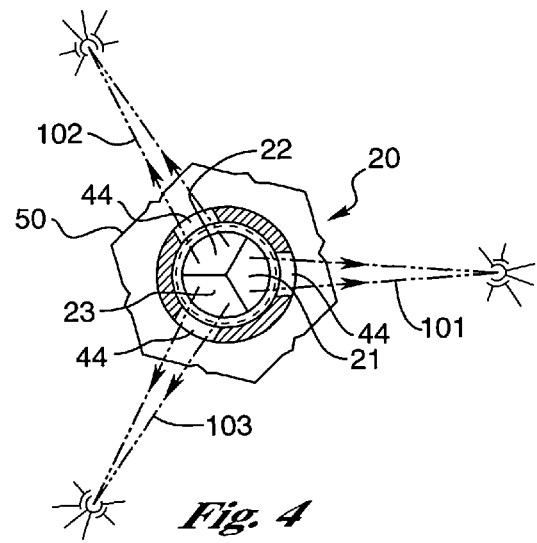
FIG. 4 is the top view of the multifaceted pyramid reflector (mirror) and silicon carbide cone cross-section.

Laser beam 100 is brought to the laser injector assembly system 10 in fiber optic cable 110, and fed to fiber optic coupling assembly 120 which introduces laser beam 100 to the inside of optical tube housing 30. Optical tube housing 30 contains lens 40 for transmitting a collimated laser beam in the optical tube housing 30 and lens 45 for focusing or converging the laser beam 100 which then passes through window 47 into a structural cone 25. The beam converges in the structural cone 25 to multi-facet pyramid reflector 20 having faces 21, 22, and 23 (as best seen in FIGS. 4 and 5) which divides and redirects laser beam 100 to radiate beamlets 101, 102 and 103 parallel to injector face plate 50 to ignite propellant in the combustion chamber 150. The convergence is not fully complete when the beam 100 hits multi-facet pyramid reflector 20, the beamlets 101, 102 and 103 continue to converge in a soft focus across the injector face plate 50 thereby focusing in the area of the injected propellants to be ignited.

The unfocussed laser beam in the laser injector system assembly 10 reduces the laser beam density and therefore the heat of laser beam 100 on the optics in the system which then reduces the heat stress and damage to the optics. Although in this embodiment the beam 100 is split into three beamlets by the multi-facet pyramid reflector 20 any number of beamlets may be used. In this embodiment the collimating lenses 40 and the focusing lens 45 are preferably sapphire lenses due to the resistance to heat and high performance optical operating properties in the ultraviolet wavelengths.

In FIG. 1 the laser injector system assembly 10 is shown fully assembled. The forward end of the laser injector system assembly 10 has a silicon carbide pyramid reflector 20 which is brazed to a silicon carbide structural cone 25. As shown in FIG. 2 the silicon carbide cone 25 extends beyond the injector face plate 50 approximately 1/10 of an inch so that laser beamlets 101, 102 and 103 can be directed parallel to and proximate the injector face plate 50 for igniting the propellant emanating therefrom. The multi-facet pyramid reflector 20 is preferably made of CVD (chemical vapor deposition) silicon carbide which is a high temperature resilient material and is polished to a high degree and then coated with a tantalum oxide coating which has a high reflectivity in the ultraviolet. The multi-facet pyramid reflector 20 is brazed to a beta sintered silicon carbide structural cone 25. In the embodiment shown the silicon carbide structural cone 25 and the multi-facet pyramid reflector 20 will be in a gross hydrogen environment, it is therefore preferred that a high purity CVD silicon carbide be used for the multi-facet pyramid reflector 20. The multi-facet pyramid reflector 20 is ground to a finished surface and sits within the silicon carbide structural cone 25. As best seen in FIG. 1 a clamp ring 80 holds the silicon carbide structural cone 25 up against a sapphire window 47. The sapphire window 47 is sized for the pressure loading of the combustion chamber 150 and is preferably sealed using a graphoil gasket flat washer seal.

The silicon carbide structural cone 25 preferably has coolant holes 27 which line up with the coolant holes 37 in tube 30 to provide center body coolant to the interior portion of the silicon carbide structural cone 25. In the present embodiment $GN_2$ coolant or purge 43 is preferably flowed into the silicon carbine structural cone 25 at higher pressure than combustion chamber pressure thus keeping combustion gases off of the silicon carbide multi-facet pyramid reflector 20. The purge gas 43 flows around the tube housing 30 of the device to the center portion of the silicon carbide structural cone 25 and through laser exit ports 44 in the structural cone 25 which meters the flow. In this manner the combustion gases in combustion chamber 150 are kept from entering and impinging on the multi-facet pyramid reflector 20 or any of the internal surfaces including the interior of the sapphire window 47. Further the exiting purge gas 43 keep combustion gasses and water vapor away from the sapphire window 47 and out of the laser beamlet (101, 102, 103) path for better beam transmission in the combustion chamber 150.

FIG. 2 shows the laser ignition system assembly 10 held within a coaxial injector housing 60. The coaxial injector housing 60 has an oxygen inlet 70 for admitting liquid oxygen to the coaxial injector elements 65 and a hydrogen inlet 75 for admitting gaseous hydrogen to the coaxial injector elements 65. The gaseous hydrogen and liquid oxygen cool the coaxial injector housing 60 surrounding the laser ignition system assembly 10 and thus protect the laser optics such as the fiber optic coupling assembly 120, the collimating lens 40, the focusing lens 45, and the sapphire window 47 from overheating causing thermal stress and the damage associated therewith.

In the embodiment shown, as best seen in FIGS. 2 and 5, the coaxial injector housing 60 has eighteen coaxial injector elements 65; however impinging injector elements or other types of injectors and different numbers of injectors may also be used. The structural cone 25 of laser ignition system assembly 10 extends beyond the injector face plate 50 of the coaxial injector housing 60 itself and the three ports as illustrated line up so that the three beamlets 101, 102 and 102 will be distributed parallel to the injector face plate 50.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A laser ignition device comprising:
    an injector housing, the injector housing having at least one channel passing therethrough for transporting a cryogenic propellant, the cryogenic propellant cooling the injector housing,
    an injector face plate on the injector housing through which the propellant is injected into a combustion chamber, and
    a laser ignition system assembly inserted through the injector housing, the laser ignition system assembly having a portion extending through the injector face plate into the combustion chamber for introducing a laser beam into the combustion chamber parallel to the injector face plate.

2. A laser ignition device as in claim 1 wherein,
    a reflector in the laser ignition system assembly in the portion of the laser ignition system assembly which extends into the combustion chamber laser beam redirects the laser beam parallel to the injector face plate.

3. A laser ignition device as in claim 2 wherein,
    the reflector splits the laser into a plurality of beamlets.

4. A laser ignition device as in claim 1 wherein,
    a purge gas is inserted into the laser ignition system assembly in the injector housing side of the injector face plate and exits the laser ignition system assembly on the combustion chamber side of the injector face plate such that the purge gas cools the laser ignition system assembly.

* * * * *